(12) United States Patent
Brown

(10) Patent No.: US 6,896,835 B2
(45) Date of Patent: May 24, 2005

(54) OPEN MOLD MULTI-LAP MANUFACTURING PROCESS

(75) Inventor: Charles M. Brown, Jackson, TN (US)

(73) Assignee: Aqua Glass Corporation, Adamsville, TN (US)

( * ) Notice: Subject to any disclaimer, the term of this patent is extended or adjusted under 35 U.S.C. 154(b) by 327 days.

(21) Appl. No.: 10/087,676

(22) Filed: Mar. 1, 2002

(65) Prior Publication Data

US 2003/0164578 A1 Sep. 4, 2003

(51) Int. Cl.⁷ .......................... B29C 41/08; B29C 39/04
(52) U.S. Cl. ............................. 264/297.7; 264/297.8; 264/308; 264/309; 425/92; 425/453
(58) Field of Search .......................... 264/297.1–297.9, 264/308–309; 425/92, 453

(56) References Cited

U.S. PATENT DOCUMENTS

| | | |
|---|---|---|
| 3,431,596 A | 3/1969 | Rodrigues et al. |
| 3,466,700 A | 9/1969 | Harrison |
| 3,506,755 A | 4/1970 | Rudder et al. |
| 3,545,039 A | 12/1970 | Duckett |
| 3,810,731 A | 5/1974 | Anderson |
| 3,898,027 A | 8/1975 | Milner |
| 4,075,301 A | 2/1978 | Oswald |
| 4,102,964 A | 7/1978 | Ridgeway |
| 4,105,734 A | 8/1978 | Nakagawa |
| 4,363,687 A | 12/1982 | Anderson |
| 4,568,604 A | 2/1986 | Kurtz et al. |
| 4,687,531 A | 8/1987 | Potoczky |
| 4,751,029 A | 6/1988 | Swanson |
| 4,952,366 A | 8/1990 | Gelin |
| 4,961,888 A | 10/1990 | Brown |
| 5,069,267 A * | 12/1991 | Larsen ........................ 164/155 |
| 5,342,565 A | 8/1994 | Goren |
| 5,591,464 A | 1/1997 | Renzo |
| 5,654,017 A | 8/1997 | Harmsen |
| 5,697,424 A * | 12/1997 | Ferdinandsen et al. ..... 164/456 |
| 6,086,813 A | 7/2000 | Gruenwald |
| 6,350,491 B1 | 2/2002 | Williams |

FOREIGN PATENT DOCUMENTS

| | | |
|---|---|---|
| EP | 0 055 862 | 7/1982 |
| JP | 59-24570 | * 2/1984 |
| JP | 05069494 | 3/1993 |

OTHER PUBLICATIONS

Hillis, D. R.; Davis A.D.: "Waste Reduction Strategies for Fiberglass Fabricators", East Carolina University, Dept. of Industrial Technology, Online! 1995, XP002244269.

Lacovara, R.: "Pollution prevention for open molding composites", Composites Fabricators Association, Online!, Apr. 2000, XP002244270.

(Continued)

Primary Examiner—Stefan Staicovici
(74) Attorney, Agent, or Firm—Carlson, Gaskey & Olds

(57) ABSTRACT

A multi-lap mold manufacturing system includes an overhead rail circuit upon which a multiple of molds transit a closed loop for a multiple of laps. The system is separated into Zones in which a particular mold operation is performed relative to which lap each of the plurality of molds has completed. At least one of the Zones is a spray Zone in which the mold is sprayed robotically. Robot utilization is extremely high as multiple spray operations occur in but a few spray Zones. Application of exceedingly expensive environmental emission control devices is at least partially mitigated by the reduced number of spray stations and the much smaller factory footprint. Consolidation of multiple spray operations into a few spray Zones also advantageously simplifies the control of chemical and ambient variables which improves production efficiencies and reduces operator dependency.

38 Claims, 5 Drawing Sheets

OTHER PUBLICATIONS

Jurinsky, J.B.: "Relationships between capture of vapor emissions and occupational exposures for open molding of reinforced plastic composites" Composites Fabricators Association, Online, Aug. 10, 2001, XP002244271.

Schwanberger, R.: "How robots are used in the composites industry", Composites Fabrication Magazine, Reprint, Online, Mar. 2000, XP002244272.

Hamilton, W.K.: "Open moulders prepare for the future", Reinforced Plastics, Elsevier Advanced Technology, New York, NY, US, vol. 45, No. 1, Jan. 2001, pp. 18–20, 22, 24, XP004331889.

PCT International search report, dated Jun. 13, 2003.

* cited by examiner

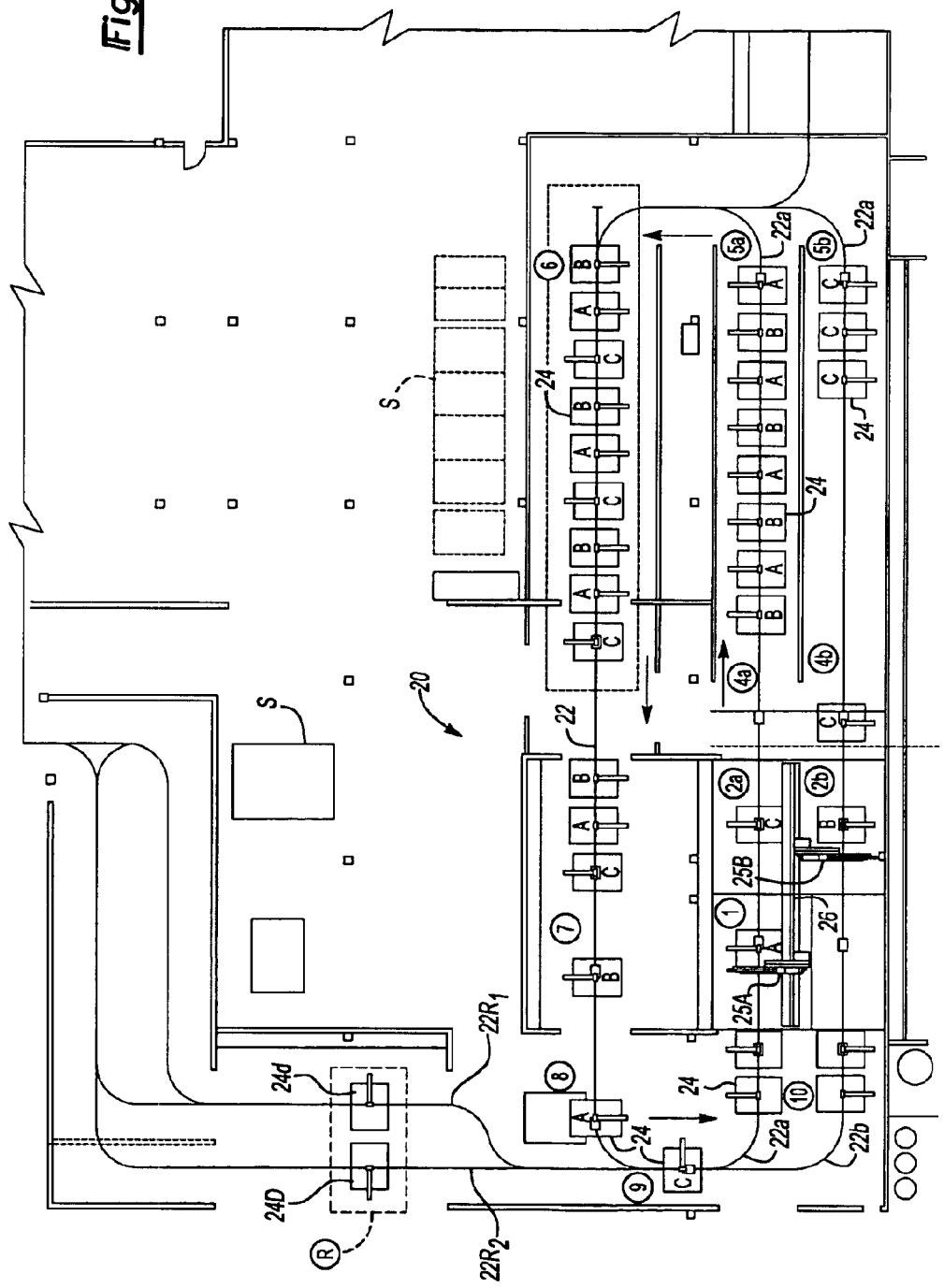

| Mold Lap | Zone 1 | Zone 2 | Lap | Zone 4 | Zone 5a/5b | Zone 6 | Zone 7 | Zone 8 | Zone 9 | Zone 10 |
|---|---|---|---|---|---|---|---|---|---|---|
| Lap 1 "A" | Gelcoat | | To lap B | Queue (4a) | Cure | Cure/ Queue | No stop req'd. | De-mold finished "c" lap part – one minute. | | Wipe – two min. total |
| Lap 2 "B" | | First Chop Coat Spray | To lap C | Queue (4b) Roll; Trim | Cure | Cure/ Queue | Rotate; Flip and Chop; Barrier Coat – two min. total. | No stop req'd. | No stop req'd. | No stop req'd. |
| Lap 1 "C" | | Cover Coat Spray | To lap A | Queue (4a) | Cure | Cure/ Queue | Foam; Base; Rotate – one min. total | No stop req'd. | No stop req'd. | No stop req'd. |

Inside Spray Booth / Outside Spray Booth

Fig-2

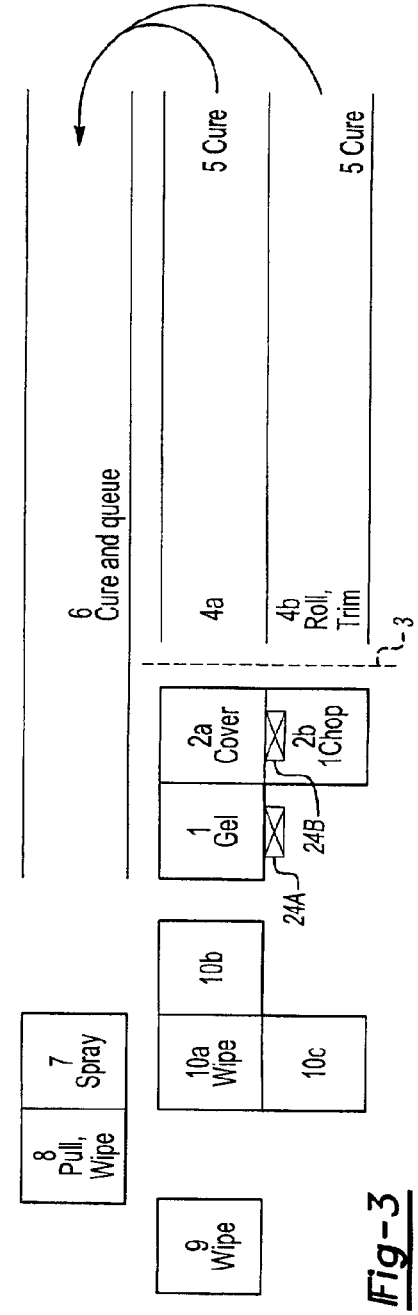

Fig-3

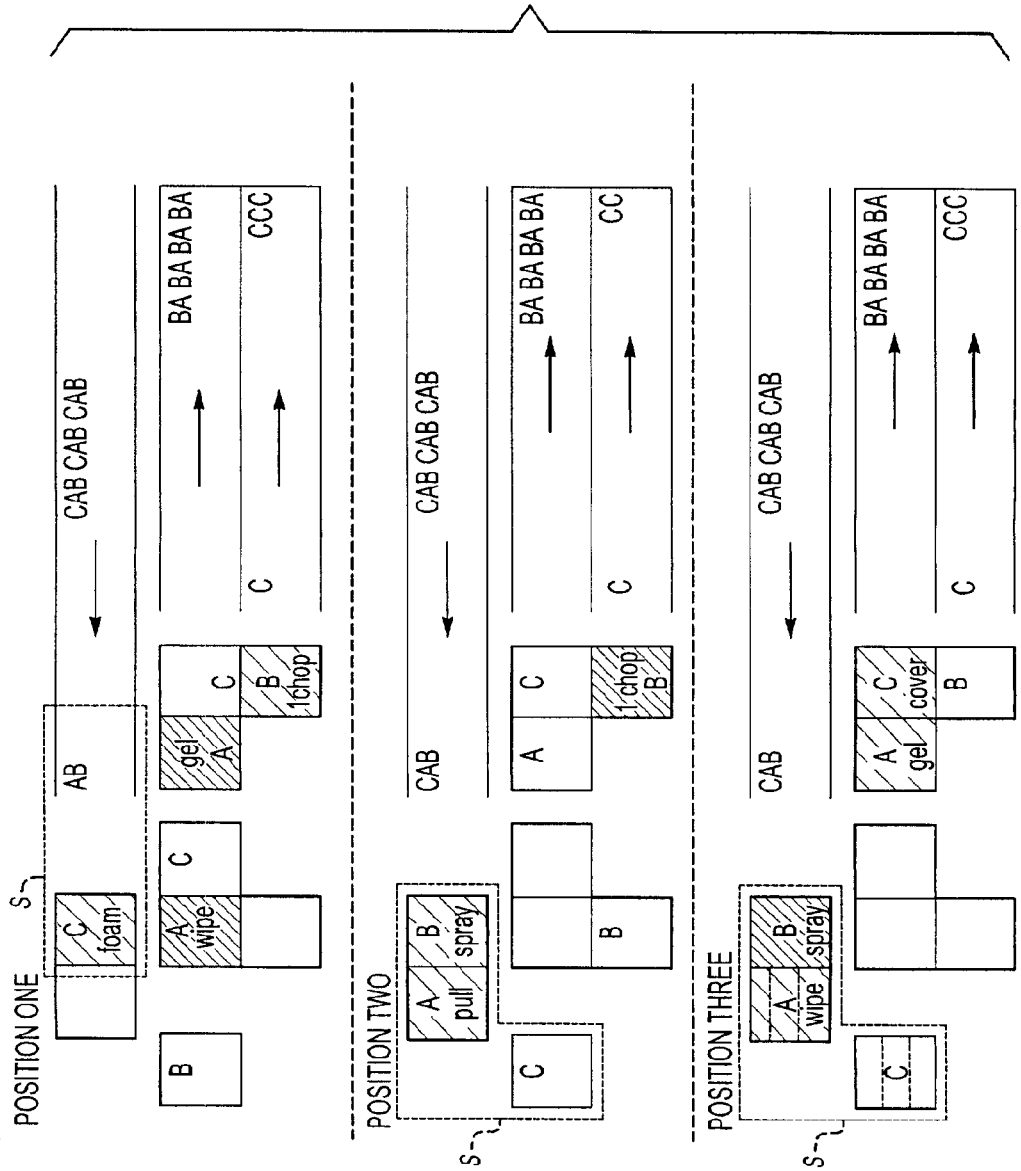

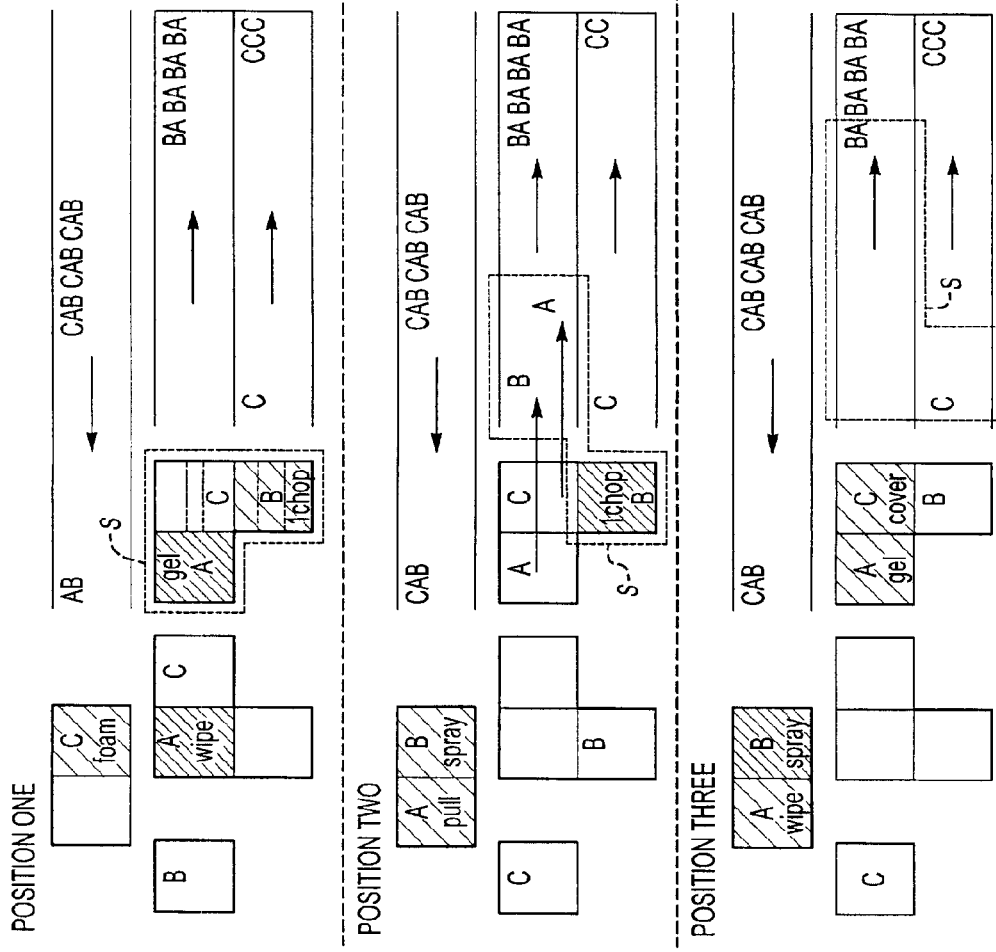

OPEN MOLD MULTI-LAP MANUFACTURING PROCESS

BACKGROUND OF THE INVENTION

The present invention relates to an open mold manufacturing process, and more particularly to a manufacturing system in which molds make multiple laps around the same circuit during which predetermined operations are performed for each lap.

Open mold fiberglass reinforced plastic molding systems are well known. Molds travel once along an assembly line. A plurality of operations are performed at stations along the assembly line until a finished part is removed from the mold at the end of the assembly line.

Multiple stations along the assembly line are spray stations. As the molds transit the spray station a particular spraying operation is performed. Such spray operations include gelcoat and resin/catalyst/chopped fiberglass fixture application. Multiple coats are often required for one or more spraying operations necessitating additional spray stations. Stringent environmental regulations apply to these spraying operations as the sprayed material involves several chemical reactions. Conventional spray stations provide an open environment in which an airflow is directed from behind a spray operator to direct mold overspray into an exhaust port.

Environmental regulations are becoming more and more inflexible. The expense of providing environmental emission control devices which meet environmental regulations often results in cost prohibitive manufacturing facilities. Often older facilities become non-compliant and must be idled. The expense of the regulation may be particularly high for an assembly line type molding system as spraying occurs at multiple locations along the assembly line. The entire facility is therefore typically subjected to particularly harsh environmental regulations.

Assembly line type molding systems require a rather large manufacturing facility footprint as a curing station typically follows each spraying station. The sequential nature of the assembly line environment provides for constant movement of the molds. The curing stations must be of a length to assure proper curing of the prior spray operation. Multiple lengthy curing stations greatly lengthens the assembly line. A larger manufacturing facility is subject to harsher environmental regulations than a smaller facility.

The sequential nature of the assembly line environment provides multiple spray stations spaced along its length. Each spray station is vulnerable to many exogenous variables that are difficult to control in a cost effective manner. Control of these variables is only magnified in larger manufacturing facilities.

Typically, human operators at each spray station are highly trained to minimize volatility in the manufacturing process. Many individual operators, even though highly trained, still may create manufacturing process volatilities due to variance in human technique and process manipulation. Robotic sprayers are often provided in place of operators to increase spraying consistency. However, this may simply result in many robotic spray stations replacing many human spray stations without a substantial reduction in expense.

Accordingly, it is desirable to provide an open mold manufacturing process which meets stringent environmental regulations within a small footprint facility. It is further desirable to minimize manufacturing process volatilities due to exogenous and human variables in a cost effective manner.

SUMMARY OF THE INVENTION

The multi-lap mold manufacturing system according to the present invention is utilized for open molding of large parts, and in particular bath tubs and shower surrounds. The system includes an overhead rail circuit upon which a multiple of molds transit a closed loop. The molds hang from the rail system such that access is readily provided to the entire mold outer surface. The system is separated into Zones in which a particular mold operation is performed relative to which lap each of the plurality of molds has completed.

At least one of the Zones is a spray Zone with a spray robot which moves along and traverses a rail mount such that a single robot accesses multiple spray Zones. Spray operations are concentrated in these spray Zones. Robot utilization is extremely high as multiple spray operations occur in but a few spray Zones. Stringent environmental regulations are applicable to facilities including these Zones. Application of exceedingly expensive environmental emission control devices is therefore at least partially mitigated by the reduced number of spray stations and the much smaller factory footprint. Consolidation of multiple spray operations into a few spray Zones also advantageously simplifies the control of chemical and ambient variables which improves production efficiencies. In addition, the consolidation of spray operations minimizes the requirement for more highly skilled labor to the spray Zones and minimizes the requirement for robot usage.

The multiple of Zones include Zones in which other spray operations and relative uncomplicated manual tasks are performed. The Zones further include curing Zones which are primarily queues in which the previous spray operations are cured. These curing and other spray Zones require the entire facility to be defined under environmental regulations. However, as the present invention provides a facility having a smaller footprint, expenses are accordingly reduced.

The molds are segregated into two parallel queues depending upon which lap the particular mold has completed. The molds are released from the queues such that the molds are staged in a third queue in a reoccurring sequence. The molds then leave the third queue to begin another lap around the system until a finished part is produced after a predetermined number of laps are completed.

Three parts come out of the spray Zones every three minutes. One finished part is pulled from the mold every three minutes when thirty molds are traversing the system. Total cycle time is approximately ninety minutes per molded part using known chemistry.

The present invention therefore provides an open mold manufacturing process which meets stringent environmental regulations within a small footprint facility. The present invention also minimizes manufacturing process volatilities due to exogenous and human variables in a cost effective manner.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general floor plan view a multi-lap mold manufacturing system designed according to the present invention;

FIG. 2 is a chart diagramming spray operations relative to lap and Zone;

FIG. 3 is a block diagram schematically illustrating the multi-lap mold manufacturing system of FIG. 1;

FIG. 4A is the block diagram of FIG. 3 illustrating a set of molds in a first three positions;

FIG. 4C is the block diagram of FIG. 3 illustrating the set of molds in a third three positions.

DETAILED DESCRIPTION OF THE PREFERRED EMBODIMENT

Figure 4B:
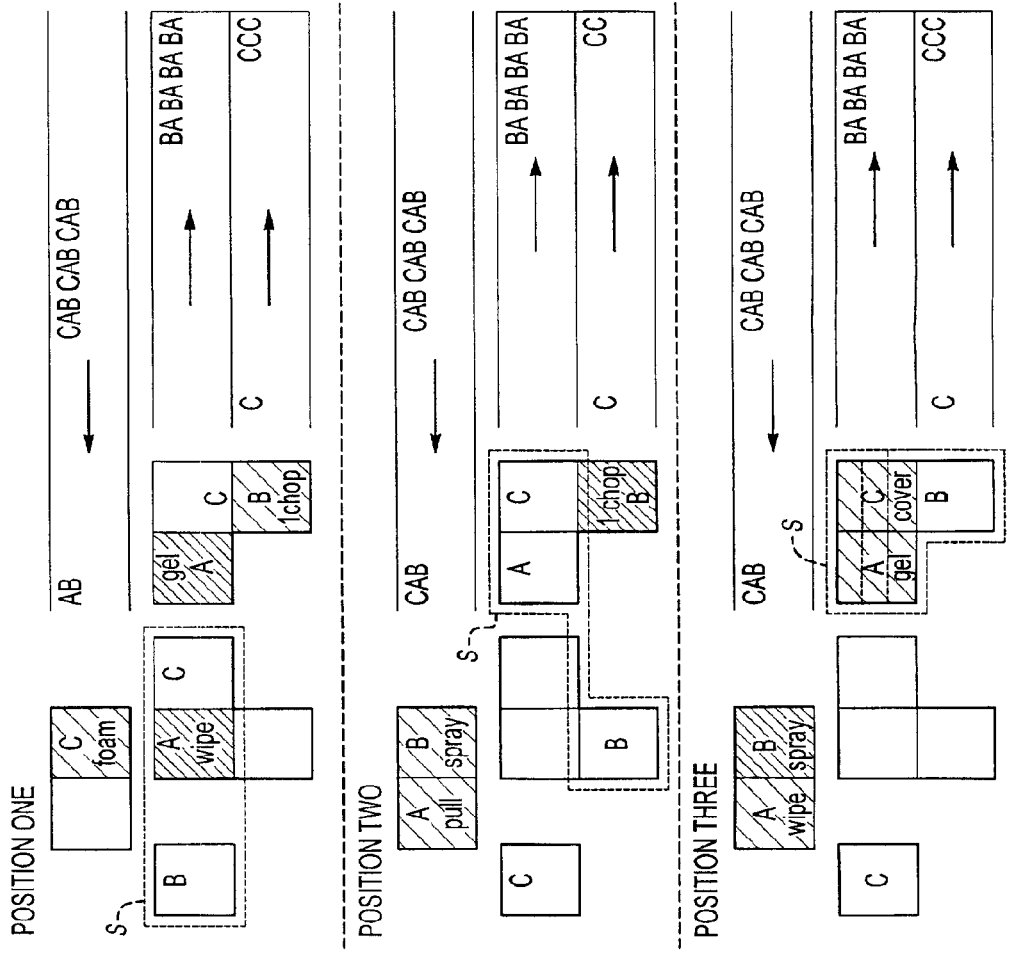
FIG. 4B is the block diagram of FIG. 3 illustrating the set of molds in a second three positions.

FIG. 1 illustrates a factory layout for a multi-lap mold manufacturing system 20. System 20 is preferably utilized for open molding of large parts, and in particular bath tubs and shower surrounds. The system 20 includes an overhead rail circuit 22 upon which a multiple of molds 24 transit a closed loop. The molds 24 hang from the rail system such that access is readily provided to the entire mold outer surface. It should be understood that other transit systems such as tracks, guided vehicles and the like will also benefit from the present invention.

The system 20 is separated into Zones in which a particular mold operation is performed depending upon which lap the mold 24 is presently on (also illustrated by the circuit map of FIG. 3 and the lap matrix of FIG. 2). The mold lap is designated by letters A–C, in which letter A designates that the mold is on the first lap; letter B designates that the mold is on the second lap; and letter C designates the mold is on its third and final lap. Preferably, the molds 24 travel through the system 20 in sets of three and in the order CAB. It should be understood that although three laps and sets of three molds 24 are discussed in the described embodiment, any number of laps and mold sets will benefit from the present invention.

The circuit alternatively or additionally provides one or more exit spurs 22r1, 22r2 which may be utilized to unload, offload, repair, replace, modify and/or otherwise add or remove molds 24 from the circuit 22. Preferably, a minor repair exit spur 22r1 from the circuit 22 provides for minor mold repair of a mold 24d essentially on-line. For major repairs, a transportation device such as a dolly, forklift, or other transportation may be moved adjacent the exit spur 22r2 to remove the mold 24D to a location remote from the circuit 22. Likewise, the molds 24 may also be removed and returned to a mold storage area S such that various batches of molds can be specifically provided in real time to meet particular customer orders by retrieving particular less utilized molds from the mold storage areas S.

Referring to FIGS. 2 and 3, the system 20 is schematically illustrated as separated in Zones by operation. Zone 1 is a spray Zone in which the mold 24 is sprayed with a layer of resin referred herein as "gelcoat". The gelcoat, as generally known, is a hardenable resin that becomes the visible surface of the finished product. Zone 1 is a spray booth station in which a spray robot (illustrated schematically at 25A in FIG. 1) moves along and traverses relative a rail mount 26. Zone 2 is also a spray Zone which is separated into a first spray Zone 2a and a second spray Zone 2b. Zone 2b is a spray Zone in which the mold 24 is sprayed with a first layer of resin/catalyst/chopped fiberglass mixture referred herein as "first chop". Zone 2a is a spray Zone in which the mold 24 is sprayed with a second layer of the resin/catalyst/chopped fiberglass mixture referred herein as "cover". A second spray robot 25B is also located within Zone 2 and preferably moves along rail mount 26. The second robot 25B preferably traverses between Zone 2a and Zone 2b such that robot 25B utilization is one hundred 100 percent. That is, robot 25B is never idle when the molding system 20 is operational as it is alternatively spraying the same mixture into Zones 2a and 2b.

Concentrated spraying only occurs in Zones 1, 2a, and 2b. The high concentration of spraying and the associated low airflow requirements provides for more effective utilization of expensive environmental emission control devices. Moreover, as the same spray Zones 1, 2a, and 2b are used repeatedly on each lap, a large number of spray operations is replaced by a small number of spray Zones. That is, a large number of spray operations (higher airflow lower spraying concentration) along a conventional assembly line type molding system are replaced by spray Zones 1, 2a and 2b which are utilized on each mold lap. Application of exceedingly expensive environmental emission control devices is therefore at least partially mitigated by the reduced number of concentrated spray stations, the associated low airflow requirements to effectively remove the emissions and the much smaller factory footprint. Preferably, the present invention utilizes one exhaust port at Zone 1, a second exhaust port for Zones 2a, and 2b, and a third and/or additional exhaust port for the remainder of the facility. It should be understood that although three exhaust ports are discussed in the described embodiment, any number of ports will benefit from the present invention. The present invention, however, provides a reduction of exhaust ports which receive a higher concentration of chemicals than heretofore conventional molding facilities.

Consolidation of multiple spray operations into a few spray Zones also advantageously simplifies the control of chemical and ambient variables which improves production efficiencies. It should be understood that although robots are preferred for Zones 1, 2a, and 2b, operators in proper protective equipment may additionally or alternatively be located in the spray Zones. In addition, the consolidation of spray operations minimizes the requirement for more highly skilled labor to the spray Zones or the required number of robots.

Zones 4–10 are mold operations which require minimal or low-concentration spraying and relatively uncomplicated manual tasks. Zone 7, for instance, is not utilized on each lap. As described above, at least one common exhaust port is typically adequate for these Zones. Zones 7–10 require minimum mold 24 stops. Zone 7 provides for a relatively light barrier coat spray and foam coat spray operation in combination with mold manipulation to provide for effective gravity-assisted spraying operations. The Zone 7 spray operations, in contrast to those in Zones 1, 2a, and 2b, occur within a spray booth having one of the system-wide exhaust ports.

Zone 8 is where a completed part is removed or "pulled" from the mold 24, i.e., demolded after it has passed through lap C. Zones 8–10a is where the bare mold is wiped down and cleaned after demolding.

Zone 10a provides for continued wiping while Zones 10b and 10c (FIG. 1) also operate as a staging area for molds 24 which are waiting to move into the spray Zones 1, 2a, and 2b. The molds 24 are also separated by lap in Zone 10. Molds which are on lap A and C are staged along rail 22a (FIG. 1) for Zone 1 and 2a while molds on lap B are staged along rail leg 22b (FIG. 1) for Zone 2b. Preferably, molds travel to Zones 1 and 2 in a down minute of the robot so full time is available for spraying.

Zones 4a, 4b, 5a, 5b and 6 are primarily queues in which the previous spray operations are cured. The system 20 footprint is further reduced as the curing Zones 4a, 4b, 5a, 5b and 6 are integrated within the rail circuit 22, i.e., a separate curing area is not sequentially located after each spraying operation along an assembly line.

Zones 4a/5a queue the molds on laps A and B in a BABABABA arrangement while Zones 4b/5b queue only the molds on lap C (FIG. 1). Notably, between Zone 2 and Zone 4 is an arbitrary line which is designated Zone 3 where a lap is completed and the lap designation is increased by one as will be further described. Two molds 24 leave Zones 4a/5a only after one mold leaves Zones 4b/5b such that molds within Zone 6 are always sequenced in sets of three in a CAB order (FIG. 1).

With reference to FIGS. 4A–4C, movement of one set S of three molds (each on a different lap) will be described to illustrate operation of the system 20. As mentioned, the molds 24 are staged in Zone 6 in the CABCABCAB order. Molds 24 within Zones 4a, 4b, 5a, 5b move from left to right in FIGS. 4A–4C which molds within Zone 6 move from right to left.

Referring to FIG. 4A, there are three positions for the system 20. Each position represents the same amount of time which, preferably, is approximately one minute. The three positions continue to rotate through positions: POSITION ONE, POSITION TWO, POSITION THREE; POSITION ONE, POSITION TWO, POSITION THREE; etc. That is, the molds are always rotating through the system 20. It should also be understood that mold set S has been selected for descriptive reasons and the set S may have been described with referenced to any beginning position.

It should be further understood that start-up and shut-down of the system 20 occurs in a staged manner. That is, only ⅓ of the molds are processed during the A lap alone. A second ⅓ of the molds begin processing on the A lap—now the original ⅓ are on the B lap. Finally, the last ⅓ begin processing on the A lap—now the original ⅓ are on the C lap; and the second ⅓ are on the B lap. Labor may therefore be added and removed from the system 20 in a staged manner to further decrease expense.

Beginning with a mold set S (illustrated within phantom line) in POSITION ONE, the first mold 24 of the set S is on lap C and is within Zone 7 (FIG. 3) while the following two molds 24 are on lap A and lap B within Zone 6. The mold 24 which is depicted as on lap A actually retains a completed product. In other words, the mold, although designated as being on lap A, actually contains a finished part which has cured in Zone 5/6.

At POSITION ONE, the lap C mold undergoes a foam spray operation (FIG. 2) for one minute within Zone 7. Schematically, the box is hatched as the mold is undergoing the first minute of the task. Also identified schematically, the lap designator C is in the top of the box to indicate that the mold spends the first minute in Zone 7.

At POSITION TWO, the C mold has moved to Zone 9, the A mold has moved into Zone 8, and the B mold has moved to Zone 7. The C mold is simply passing through Zone 9 as no operation is performed (FIG. 2). As described above, the A mold has the finished part removed such that the mold 24 is set to start the entire process again. Schematically, the Zone 8 box is hatched as the mold is undergoing the first minute of the task. The B mold has moved into Zone 7. The B mold undergoes the first minute of manipulation and barrier coat spray (FIG. 2). Schematically, the Zone 7 box is hatched as the mold is undergoing the first minute of the task.

At POSITION THREE, the C mold, A mold, and the B mold remain in the same Zones. As the C mold, A mold, and the B mold remain in the same Zone as POSITION TWO, the lap designators schematically move to the central portion of their respective box to indicate that the molds are spending their second minute in the same Zone. The C mold still has no operation performed (FIG. 2). The A mold is now wiped down in the second minute at Zone 8, however this is the first minute of the wipe operation. Schematically, the Zone 8 box is hatched as the mold is undergoing the first minute of the wipe operation. The B mold remains in Zone 7 while the second minute of the two minute long task (FIG. 2) is completed. Schematically, the Zone 8 box is shaded as the mold is undergoing the second minute of the barrier coat operation (FIG. 2).

Referring to FIG. 4B POSITION ONE, the C mold has moved to Zone 10b, the A mold has moved into Zone 10a, and the B mold has moved to Zone 9. As the C mold, A mold, and the B mold move to new Zones, the lap designators schematically move to the top portion of their respective box to indicate that the molds are spending their first minute in their respective Zones. Schematically, the Zone 10a box is shaded as the A mold is undergoing the second minute of the wipe operation (FIG. 2). The molds are being staged in Zone 10 (FIG. 1) prior to entering the spray Zones.

At POSITION TWO, the C mold has moved to Zone 2a, the A mold has moved into Zone 1, and the B mold has moved to Zone 10c. No operations are performed. As the C, A and B mold move to new Zones, the lap designators schematically move to the top portion of their respective box to indicate that the molds are spending their first minute in their respective Zones. It should be noted, however, that when the molds reach staging Zone 10, the A mold and C mold are staged along rail 22a (FIG. 1) for Zones 1 and 2a, respectively, while the B mold is staged along rail leg 22b (FIG. 1) for Zone 2b.

At POSITION THREE, the C mold and the A mold remain in the same Zones. As the C mold and A mold remain in the same Zone as POSITION TWO, the lap designators schematically move to the central portion of their respective box to indicate that the molds are spending their second minute in the same Zone. The B mold moves into Zone 2b and the lap designator is schematically moved to the top of the Zone 2b box to indicate that the B molds is spending its first minute in the 2b. Schematically, the Zone 2a box and Zone 1 box is hatched as the respective C mold and A mold are undergoing the first minute of the spray operation. Specifically, the C mold is undergoing the first minute of the cover coat spray by robot 25B, while the A mold is undergoing the first minute of the gelcoat spray by robot 25A.

Referring to FIG. 4C POSITION ONE, the C mold, A mold, and the B mold remain in the same Zones. As the C mold and A mold remain for a third minute in the same Zone, the lap designators schematically move to the bottom portion of their respective box to indicate that the molds are spending their third minute in the same Zone. As the B mold remains for a second minute in the same Zone, the B lap designator schematically moves to the central portion of its box to indicate that the mold is spending its second minute in the same Zone.

Schematically, the Zone 1 box is shaded as the A mold is undergoing the second minute of the gelcoat spray by robot 25A. No operation is performed on the C mold. Schematically, the Zone 2b box is hatched as the B mold is undergoing the first minute of the chop spraying operation. That is, robot 25B (FIG. 1) pivots away from the C mold to provide the first minute of chop coat spray to mold B. Further, if the cover coat spray by robot 25B is completed early, robot 25B can immediately thereafter pivot to begin the chop coat spray to mold B.

Referring to FIG. 4C POSITION TWO, lap operations for the C mold and A mold are complete. The C mold and A mold, having completed their operations are schematically changed to an A mold and a B mold lap designation and move into staging area 4a. As discussed above, the C mold is designated as an A mold but the finished part must cure through Zone 6 until it is finally removed at Zone 8 (FIG. 4A, POSITION TWO). The A mold becomes a B mold and travels two more laps around the system 20. The lap indicator of the B mold within Zone 2b schematically moves to the bottom of the Zone 2b box to indicate that it is spending the third minute at Zone 2b. Schematically, the Zone 2b box is shaded as the B mold is undergoing the second minute of the chop operation (FIG. 2).

Referring to FIG. 4C POSITION THREE, lap operations for the B mold is complete. The B mold, having completed its operation is schematically changed to a C mold lap designation and moves into staging area 4b where a rolling and trimming operation are performed. The B mold is now a C mold which travels one more lap around the system 20.

Three parts come out of the spray Zones 1, 2a, and 2b every three minutes so one part is pulled every three minutes when thirty molds are traversing the system 20. Total cycle time is approximately ninety minutes per molded part using known chemistry.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of molding an article comprising the steps of:
   (1) defining a closed circuit;
   (2) transiting a plurality of open molds about the closed circuit for a plurality of laps; and
   (3) performing a predetermined series of operations during each of said plurality of laps, the predetermined series of operations including transiting the plurality of open molds through a spraying operation as a multiple of sets in which each set includes a reoccurring sequence of open molds in which each open mold within each set is on a different lap.

2. A method as recited in claim 1, wherein said step (3) comprises a spraying operation during each of the laps.

3. A method as recited in claim 2, wherein said spraying operation occurs within a common spray booth during each of the laps.

4. A method as recited in claim 1, wherein the plurality of laps of said step (2) comprises three laps and three open molds within the set.

5. A method as recited in claim 1, wherein said step (2) comprises transiting a plurality of molds along the closed circuit in a predetermined sequence.

6. A method as recited in claim 5, further comprising the step of:
   ordering the plurality of molds into the spraying operation as a reoccurring sequence of sets of open molds.

7. A method as recited in claim 5, further comprising the step of:
   ordering the plurality of molds in a reoccurring sequence dependent upon which lap each of the plurality of molds has completed.

8. A method as recited in claim 1, further comprising the step of:
   ordering the set with a mold on a first lap following a mold on a final lap.

9. A method as recited in claim 8, wherein said ordering step further comprises the step of:
   following the mold on the first lap with a mold on a second lap.

10. A method as recited in claim 1, further comprising the step of:
    queuing the plurality of molds after completion of one of the plurality of laps within a queue along the closed circuit.

11. A method as recited in claim 10, wherein said queuing step further comprises the step of:
    curing the plurality of molds while within the queue.

12. A method as recited in claim 10, wherein said queuing step further comprises the step of:
    segregating the plurality of molds into a first and a second parallel queue relative to which lap each of the plurality of molds has completed.

13. A method as recited in claim 12, wherein said queuing step further comprising the steps of:
    releasing a first mold from the first queue;
    releasing a second mold and a third mold from the second queue; and
    sequencing the third mold after the second mold and the second mold after the first mold along the closed circuit.

14. A method as recited in claim 1, further comprising the steps of:
    segregating the plurality of molds into a first queue and a second queue relative to which lap each of the plurality of molds has completed;
    transiting the molds within the first queue through a first spraying operation; and
    transiting the molds within the second queue through a second spraying operation.

15. A method as recited in claim 14, wherein said first spraying operation and said second spraying operation are performed sequentially.

16. A method as recited in claim 14, wherein said first spraying operation and said second spraying operation are performed sequentially by a single robotic sprayer.

17. A method of molding an article comprising the steps of:
    (1) defining a closed circuit;
    (2) ordering a plurality of open molds in a reoccurring sequence dependent upon which lap each of the plurality of molds has completed;
    (3) transiting the plurality of open molds about the closed circuit for a plurality of laps; and
    (4) performing a predetermined series of operations on each of the plurality of open molds during each of said plurality of laps, the predetermined series of operations including transiting the plurality of open molds through a spraying operation as a multiple of sets in which each set includes a reoccurring sequence of open molds in which each open mold within each set is on a different lap.

18. A method as recited in claim 17, further comprising the step of:

queuing the plurality of molds prior to said spraying operation.

19. A method as recited in claim 18, wherein said queuing step further comprises the step of:

segregating the plurality of molds into a first and a second parallel queue relative to which lap each of the plurality of molds has completed prior to said spraying operation.

20. A method as recited in claim 17, further comprising the step of:

segregating the plurality of molds into a first and a second parallel queue relative to which lap each of the plurality of molds has completed;

transiting a first mold from the first queue through a first spraying operation; and transiting a second mold from the second queue through a second spraying operation.

21. A method as recited in claim 20, further comprising the steps of:

transiting the first mold from the first spraying operation to a third queue along a common circuit with said first queue; and transiting the second mold from the second spraying operation to a fourth queue along a common circuit with said second queue.

22. A method as recited in claim 21, further comprising the steps of:

merging the first mold from the third queue with the second mold from the fourth queue into a fifth queue;

curing the first mold and the second mold within the fifth queue.

23. A method as recited in claim 21, further comprising the steps of:

releasing the first mold from the third queue;

releasing the second mold and a third mold from the fourth queue;

merging the first mold from the third queue with the second mold and the third mold from the fourth queue into a fifth queue such that the molds within the fifth queue are sequenced in a predetermined order; and curing the molds within the fifth queue.

24. A method as recited in claim 23, further comprising the steps of:

releasing the first mold, second mold and the third mold from the fifth queue as a set of molds sequenced in said predetermined order.

25. A method of molding an article comprising the steps of:

(1) defining a closed circuit;

(2) transiting a plurality of open molds about the closed circuit for a plurality of laps;

(3) performing a predetermined series of operations during each of said plurality of laps, the predetermined series of operations including transiting the plurality of open molds through a spraying operation as a multiple of sets in which each set includes a reoccurring sequence of open molds in which each open mold within each set is on a different lap; and (4) removing one of the plurality of open molds from the closed circuit to perform an off-circuit operation.

26. A method as recited in claim 25, wherein said step (4) comprises transiting the one of the plurality of open molds along an exit spur which extends from the closed circuit.

27. A method as recited in claim 25, wherein the off-circuit operation of said step (4) comprises a repair operation.

28. A method as recited in claim 25, wherein the off-circuit operation of said step (4) comprises removing the one of the plurality of molds to a storage area.

29. A method of molding an article comprising the steps of:

(1) defining a closed circuit;

(2) transiting a plurality of open molds about the closed circuit for a plurality of laps;

(3) performing a predetermined series of operations during each of said plurality of laps, the predetermined series of operations including transiting the plurality of open molds through a spraying operation as a multiple of sets in which each set includes a reoccurring sequence of open molds in which each open mold within each set is on a different lap; and (4) transiting a mold along a spur which extends from the closed circuit to insert an open mold to the plurality of open molds on the closed circuit.

30. A method as recited in claim 1, wherein said step (3) further comprises ordering each open mold within each set in a third lap, first lap, second lap sequence prior to entering the spraying operation.

31. A method as recited in claim 17, wherein said step (4) further comprises ordering each open mold within each set in a third lap, first lap, second lap sequence prior to entering the spraying operation.

32. A method as recited in claim 25, wherein said step (3) further comprises ordering each open mold within each set in a third lap, first lap, second lap sequence prior to entering the spraying operation.

33. A method as recited in claim 29, wherein said step (3) further comprises ordering each open mold within each set in a third lap, first lap, second lap sequence prior to entering the spraying operation.

34. A method as recited in claim 1, wherein the spraying operation of said step (3) further comprises:

continually cycling through three positions.

35. A method as recited in claim 17, wherein the spraying operation of said step (4) further comprises:

continually cycling through three positions.

36. A method as recited in claim 25, wherein the spraying operation of said step (4) further comprises:

continually cycling through three positions.

37. A method as recited in claim 29, wherein the spraying operation of said step (4) further comprises:

continually cycling through three positions.

38. A method as recited in claim 1, further comprising the step of:

starting-up and shutting-down the transiting of the plurality of open molds in a staged manner.

* * * * *